United States Patent

[11] 3,529,535

| [72] | Inventor | Richard Andrey, |
| | | 43 Grey, 1004 Lausanne, Switzerland |
| [21] | Appl. No. | 739,026 |
| [22] | Filed | June 21, 1968 |
| [45] | Patented | Sept. 22, 1970 |

[54] DEVICE FOR THE REMOVING OF EGGS FROM A PAN AFTER BOILING
1 Claim, 2 Drawing Figs.

[52] U.S. Cl. .................................................. 99/336
[51] Int. Cl. .................................................. A47j 29/04
[50] Field of Search........................................... 99/336, 330, 403, 440, 441, 442, 427, 428, 410, 413, 417, 325, 327, 332, 335

[56] References Cited
UNITED STATES PATENTS

| 867,921 | 10/1907 | Martin.......................... | 99/336 |
| 1,876,072 | 9/1932 | Noonan........................ | 99/336 |
| 2,699,719 | 1/1955 | Zelante ....................... | 99/336 |

Primary Examiner—Robert W. Jenkins
Attorney—Peter M. Boesen

ABSTRACT: This invention relates to a device which automatically removes eggs from a receptacle in which they have been immersed in boiling water for a predetermined period of time.

Patented Sept. 22, 1970

3,529,535

INVENTOR
ANDREY RICHARD

DEVICE FOR THE REMOVING OF EGGS FROM A PAN AFTER BOILING

The device in accordance with the present invention is composed of at least one cup intended to contain the egg to be boiled, a lever which moves in a vertical plane and to the end of the arm of which there is fastened a horizontal shaft bearing the cup, a hook which actuates a lock which holds the lever in horizontal position within the pan, a clock mechanism which after predetermined periods of time frees, via a rod or similar system, the lever from the hook, retaining it and brings it into a vertical position as a result of a tension spring and throwing it, as well as the cup and its contents, outside the field of the pan and the steam which is liberated, a framework intended to receive the fixed part of the device and having on the outside a clockwork control as well as a hook intended to fasten the device on the vertical circular edge of the pan. One of the possible forms of the frame consists of an egg mold.

The accompanying drawing shows by way of example one embodiment of the device for the extraction of eggs from a pan after boiling.

FIG. 1 shows the device on the one hand during the boiling with the lever in horizontal position within the pan, and on the other hand after boiling with the lever in vertical position thrown out of the field of the pan and of the steam which is liberated.

Figure 1:
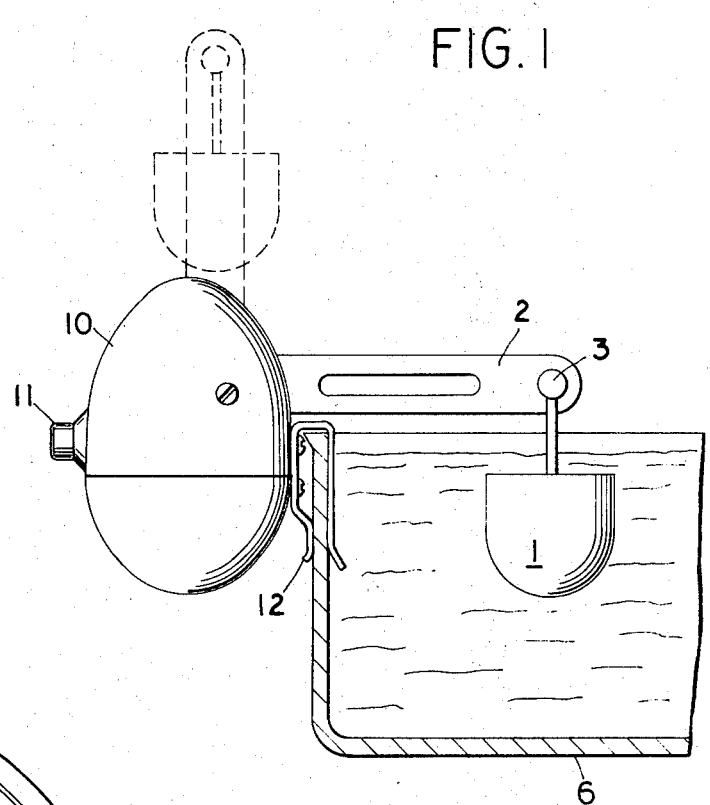
FIG. 1 is an elevation of the device.
Figure 2:
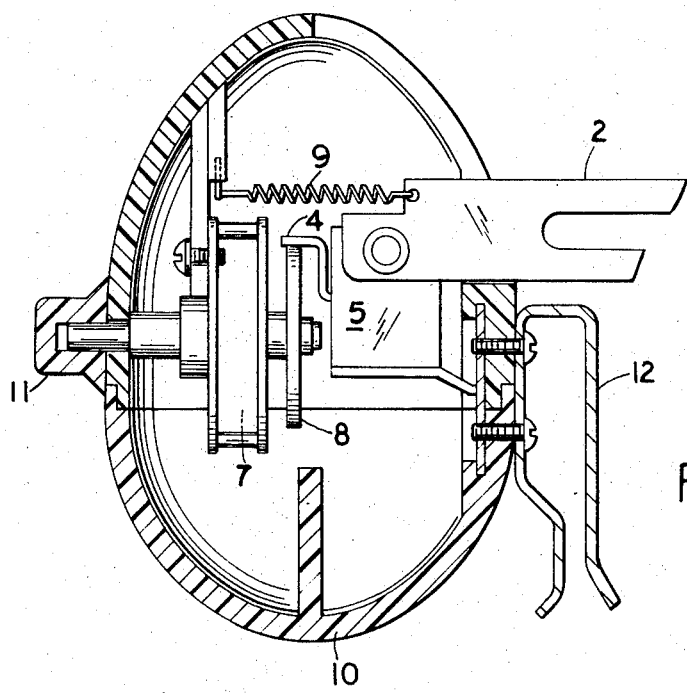
FIG. 2 is a vertical section through the device.

The device for the extracting of the egg from a pan after cooking comprises a cup 1 intended to contain the egg to be boiled, a lever 2 which moves along a vertical plane and to the end of the arm of which there is fastened a horizontal pin 3 which supports the cup 1, a hook 4 actuating a lock 5, holding the lever 2 in horizontal position within a pan 6, a clockwork 7 which after predetermined periods of time, by means of a rod 8, releases the lever 2 from the hook 4 holding it, bringing it into a vertical position by means of a tension spring 9 and throwing it, as well as the cup 1 and its contents out of the field of the pan 6 and of the steam which is liberated, an egg-shaped frame 10 intended to receive the fixed part of the device and comprising on the outside a clockwork control 11, as well as a hook 12 intended to fasten the device on the vertical circular edge of the pan 6.

The device operates in the following manner:

Once the egg is introduced into cup 1 the lever 2 is cocked and the clockwork 7 is adjusted by means of the control 11, according to the desired time of boiling.

After the time of boiling is determined, the hook 4 via the rod 8 actuates the lock 5, releasing the lever 2 and bringing it into a vertical position due to the tension spring 9, thus bringing the contents of the cup out of the pan 6 and out of the field of action of the steam which is given off.

I claim:

1. A device for the removal of eggs from a receptacle for the containment of a quantity of boiling water, said device comprising at least one hollow member of substantially hemispherical contour adapted to receive and partially contain an egg, said member being suspended from a shaft, and means connecting said shaft to a lifting member, said lifting member being in turn connected to and activated by a timing mechanism for the determination of a desired period of time for the immersion of said hemispherical member in the boiling water in said receptacle and the removal of said member therefrom at the end of said period of time, by said activation of said lifting member.